United States Patent
Rathay et al.

(10) Patent No.: US 10,612,391 B2
(45) Date of Patent: Apr. 7, 2020

(54) TWO PORTION COOLING PASSAGE FOR AIRFOIL

(71) Applicant: General Electric Company, Schenectady, NY (US)

(72) Inventors: Nicholas William Rathay, Rock City Falls, NY (US); Brian Gene Brzek, Clifton Park, NY (US); Jason Ray Gregg, Greenville, SC (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/862,932

(22) Filed: Jan. 5, 2018

(65) Prior Publication Data
US 2019/0211685 A1   Jul. 11, 2019

(51) Int. Cl.
  *F01D 5/18* (2006.01)
  *F01D 5/28* (2006.01)
  *F01D 5/14* (2006.01)

(52) U.S. Cl.
  CPC .............. *F01D 5/186* (2013.01); *F01D 5/143* (2013.01); *F01D 5/147* (2013.01); *F01D 5/18* (2013.01); *F01D 5/187* (2013.01); *F01D 5/288* (2013.01); *F05D 2230/10* (2013.01); *F05D 2260/202* (2013.01); *F05D 2300/611* (2013.01)

(58) Field of Classification Search
  None
  See application file for complete search history.

(56) References Cited

U.S. PATENT DOCUMENTS

| 4,653,983 A | 3/1987 | Vehr |
| 4,672,727 A * | 6/1987 | Field ...................... B23P 15/02 29/527.2 |
| 6,955,522 B2 | 10/2005 | Cunha et al. |

(Continued)

FOREIGN PATENT DOCUMENTS

| EP | 2559855 A2 | 2/2013 |
| EP | 2537606 B1 | 2/2016 |

(Continued)

OTHER PUBLICATIONS

S. Bunker, "A Review of Shaped Hole Turbine Film-Cooling Technology", Journal of Heat Transfer, vol. 127, Issue: 4, pp. 441-453, Mar. 30, 2005.

(Continued)

*Primary Examiner* — Christopher Verdier
*Assistant Examiner* — Jason A Fountain
(74) *Attorney, Agent, or Firm* — Dale Davis; Hoffman Warnick LLC

(57) ABSTRACT

A turbine airfoil includes a body having an airfoil wall, and a coolant chamber within the body. A plurality of cooling passages are within the airfoil wall, each cooling passage includes: a first portion extending from a first point on an exterior surface of the airfoil wall to the coolant chamber, and a second portion extending from a second point on the exterior surface of the airfoil wall distal from the first point to intersect a mid-portion of the first portion. A cap element closes the first portion at the first point but leaving the second portion open. Each cooling passage has a single inlet in fluid communication with the coolant chamber and a single outlet at the second point of the second portion.

18 Claims, 8 Drawing Sheets

(56) References Cited

U.S. PATENT DOCUMENTS

| | | | |
|---|---|---|---|
| 7,273,351 B2 | 9/2007 | Kopmels | |
| 7,371,049 B2 * | 5/2008 | Cunha | B23P 15/04 29/889.7 |
| 8,168,912 B1 | 5/2012 | Liang | |
| 8,777,571 B1 | 7/2014 | Liang | |
| 8,814,500 B1 | 8/2014 | Liang | |
| 8,938,879 B2 | 1/2015 | Bunker | |
| 9,133,716 B2 | 9/2015 | Liang | |
| 9,181,819 B2 | 11/2015 | Lee et al. | |
| 9,188,012 B2 | 11/2015 | Lacy et al. | |
| 9,206,696 B2 | 12/2015 | Bunker et al. | |
| 9,327,384 B2 | 5/2016 | Bunker | |
| 9,416,662 B2 | 8/2016 | Morgan et al. | |
| 9,441,488 B1 | 9/2016 | Johnson | |
| 9,458,725 B2 | 10/2016 | Morgan et al. | |
| 9,770,785 B2 | 9/2017 | Hu et al. | |
| 9,897,006 B2 * | 2/2018 | Miranda | F02C 7/18 |
| 9,951,647 B2 | 4/2018 | Rawson | |
| 10,415,396 B2 * | 9/2019 | Bunker | F01D 5/288 |
| 2009/0169394 A1 | 7/2009 | Crow et al. | |
| 2016/0003056 A1 | 1/2016 | Xu | |
| 2016/0008889 A1 | 1/2016 | Xu | |
| 2016/0032766 A1 | 2/2016 | Bunker et al. | |
| 2016/0177733 A1 | 6/2016 | Lewis et al. | |
| 2016/0186577 A1 | 6/2016 | Willett, Jr. | |
| 2016/0201474 A1 | 7/2016 | Slavens et al. | |
| 2016/0363052 A1 * | 12/2016 | Miranda | F02C 7/18 |
| 2017/0129013 A1 | 5/2017 | Bunker | |
| 2017/0129014 A1 | 5/2017 | Bunker | |
| 2017/0145830 A1 | 5/2017 | Jacala et al. | |
| 2017/0175569 A1 | 6/2017 | Rawson | |
| 2017/0328215 A1 * | 11/2017 | Bunker | F01D 5/147 |
| 2018/0135423 A1 | 5/2018 | Dyson et al. | |
| 2018/0171872 A1 | 6/2018 | Dyson et al. | |

FOREIGN PATENT DOCUMENTS

| | | |
|---|---|---|
| EP | 3034782 A1 | 6/2016 |
| JP | 2010144578 | 7/2010 |

OTHER PUBLICATIONS

Li et al., "Rapid casting of turbine blades with abnormal film cooling holes using integral ceramic casting molds", The International Journal of Advanced Manufacturing Technology, vol. 50, Issue: 1-4, pp. 13-19, Sep. 2010.

* cited by examiner

TWO PORTION COOLING PASSAGE FOR AIRFOIL

CROSS-REFERENCE TO RELATED APPLICATIONS

This application is related to U.S. application Ser. No. 15/862,927, filed concurrently and currently pending.

BACKGROUND OF THE INVENTION

The disclosure relates generally to turbine airfoil cooling, and more particularly, to two portion cooling passages for a turbine airfoil.

The airfoils of gas turbine blades and nozzles are exposed to excessive heat loads. Airfoils are typically covered with a high concentration of a thermal barrier coating (TBC). Consequently, the TBC experiences spalls, which makes cooling the airfoils more difficult. In order to cool the airfoils, a coolant is typically introduced through cooling passages from an interior chamber of the airfoil through holes to an exterior surface of the airfoil. The cooling passages are arranged in large numbers, which creates many holes in the airfoil. At the leading edge, cooling hole arrangements may be referred to as a showerhead arrangement. Ideally, the coolant creates a cooling film, i.e., a flow across and close to the surface of the airfoil, which extends downstream along a surface of the airfoil.

On the leading edge, cooling passages with traditional round or conical shaped exit holes are radially oriented relative to the surface, i.e., they are drilled perpendicularly relative to the hot gas flow direction. Consequently, the cooling flow has to make a sharp turn and is susceptible to blowing off of the airfoil surface, which may reduce the coolant coverage and laterally-averaged cooling effectiveness. Cooling passages having shaped diffusion exit holes are typically used in other regions on the airfoil and have a relatively high cooling effectiveness, but have not been successfully used in the leading edge because of the small radius of curvature of the leading edge. That is, the shaped diffusion exit holes need to be drilled nearly perpendicular to the surface using traditional manufacturing methods. This arrangement results in reduced cooling performance.

In addition to the above challenges, there is an increased need to reduce overall coolant usage to meet forward lean efficiencies while also maintaining film cooling at the leading edge. In order to reduce overall cooling flows, fewer cooling passages are typically used, resulting in increased spacing between holes. Each cooling passage must therefore have increased laterally-averaged cooling effectiveness and increased lateral coolant coverage. Many advanced film designs rely on additive manufacturing to create improved cooling passages, but there are many challenges that need to be overcome before this technology can be put into widespread use in the hot gas path section.

BRIEF DESCRIPTION OF THE INVENTION

A first aspect of the disclosure provides a turbine airfoil, comprising: a body having an airfoil wall; a coolant chamber within the body; and a plurality of cooling passages within the airfoil wall, each cooling passage including: a first portion extending from a first point on an exterior surface of the airfoil wall to the coolant chamber, a second portion extending from a second point on the exterior surface of the airfoil wall distal from the first point to intersect a mid-portion of the first portion, and a cap element closing the first portion at the first point but leaving the second portion open, wherein each cooling passage has a single inlet in fluid communication with the coolant chamber and a single outlet at the second point of the second portion.

A second aspect of the disclosure provides a method of forming a cooling passage in an airfoil wall of an airfoil, the turbine airfoil including a coolant chamber therein, the method including: forming a first portion of the cooling passage, the first portion extending from a first point on an exterior surface of the airfoil wall to the coolant chamber; forming a second portion of the cooling passage, the second portion extending from a second point on the exterior surface of the airfoil wall distal from the first point to intersect a mid-portion of the first portion; and closing the first portion at the first point with a cap element but leaving the second portion open, wherein each cooling passage has a single inlet in fluid communication with the coolant chamber and a single outlet at the second point of the second portion.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
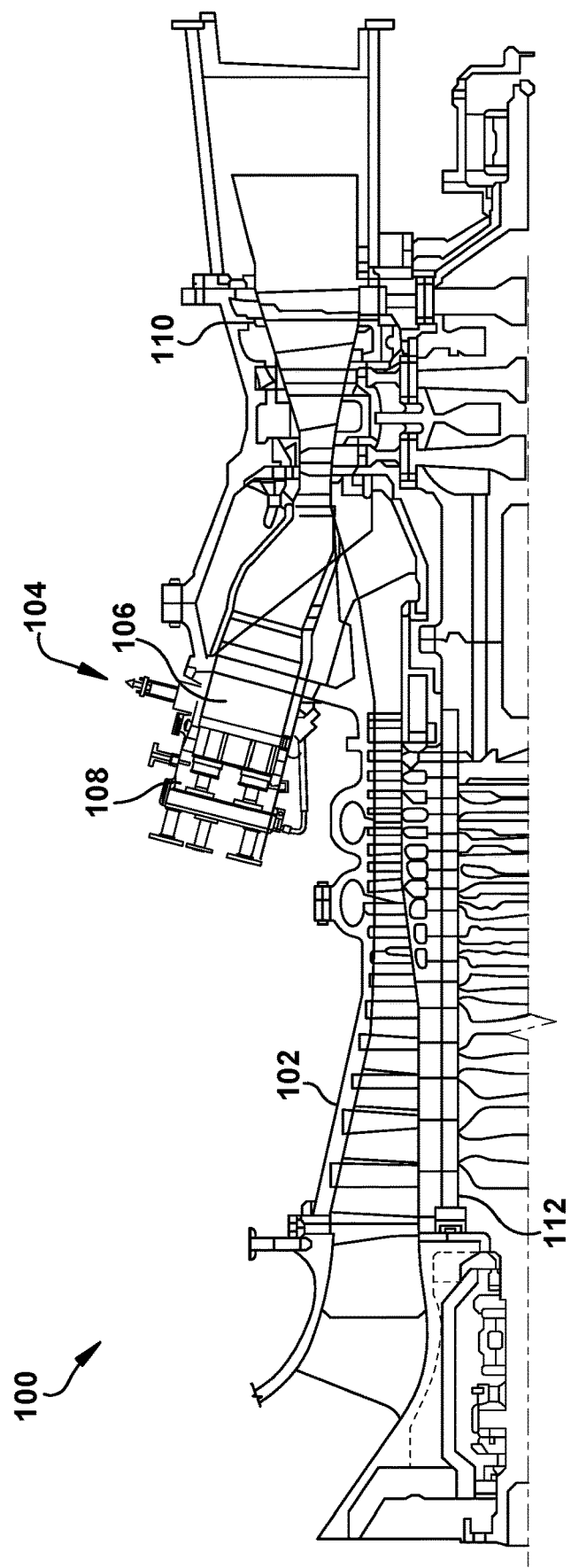
FIG. 1 shows a schematic view of an illustrative turbomachine in the form of a gas turbine system.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Embodiments of the disclosure provide a turbine airfoil including cooling passages having a first portion extending from a first point on an exterior surface of the airfoil wall to a coolant chamber in the turbine airfoil, and a second portion extending from a second point on the exterior surface of the airfoil wall at a second point distal from the first point to intersect a mid-portion of the first portion. A cap element closes the first portion at the first point but leaves the second portion open. Thus, each cooling passage has a single inlet in fluid communication with the coolant chamber and a single outlet at the second point of the second portion. The first and second portions can be made in two separate manufacturing steps. The outlet may include a diffuser, which helps guide the coolant. The turbine airfoil exhibits improved averaged film cooling effectiveness and increased coolant coverage compared to conventional showerhead arrangements, which may increase combined cycle efficiency and improved part durability. The cooling passages can be applied in a leading edge wall of the turbine airfoil, among other locations.

FIG. 1 shows a schematic illustration of an illustrative industrial machine including a turbine airfoil to which teachings of the disclosure may be applied. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine 110 and a common compressor/turbine shaft 112 (sometimes referred to as a rotor 112). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular gas turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to any turbine airfoil requiring film cooling of a leading edge thereof in, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine that rotatably couples to and drives rotor 112. Compressor 102 also is rotatably coupled to rotor 112. In the illustrative embodiment, there is a plurality of combustors 106 and fuel nozzle assemblies 108.

Figure 2:
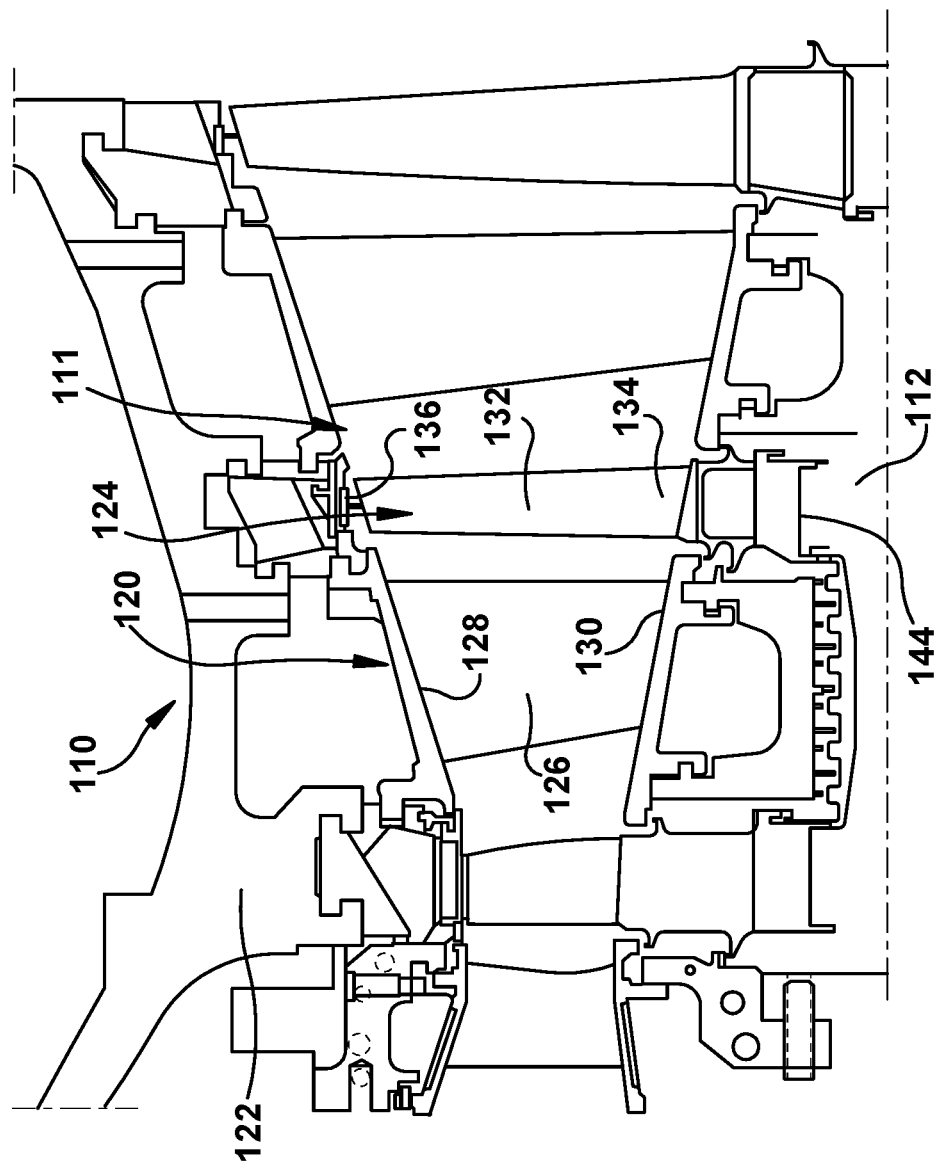
FIG. 2 shows a cross-sectional view of an illustrative gas turbine assembly that may be used with the gas turbine system in FIG. 1.

FIG. 2 shows a cross-sectional view of an illustrative turbine assembly 110 of turbomachine 100 (FIG. 1) that may be used with the gas turbine system in FIG. 1. A turbine 111 of turbine assembly 110 includes a row of nozzle or vanes 120 coupled to a stationary casing 122 of turbomachine 100 and axially adjacent a row of rotating blades 124. A nozzle or vane 126 may be held in turbine assembly 110 by a radially outer platform 128 and a radially inner platform 130. Row of blades 124 in turbine assembly 110 includes rotating blades 132 coupled to rotor 112 and rotating with the rotor. Rotating blades 132 may include a radially inward platform 134 (at root of blade) coupled to rotor 112 and a radially outward tip shroud 136 (at tip of blade).

Figure 3:
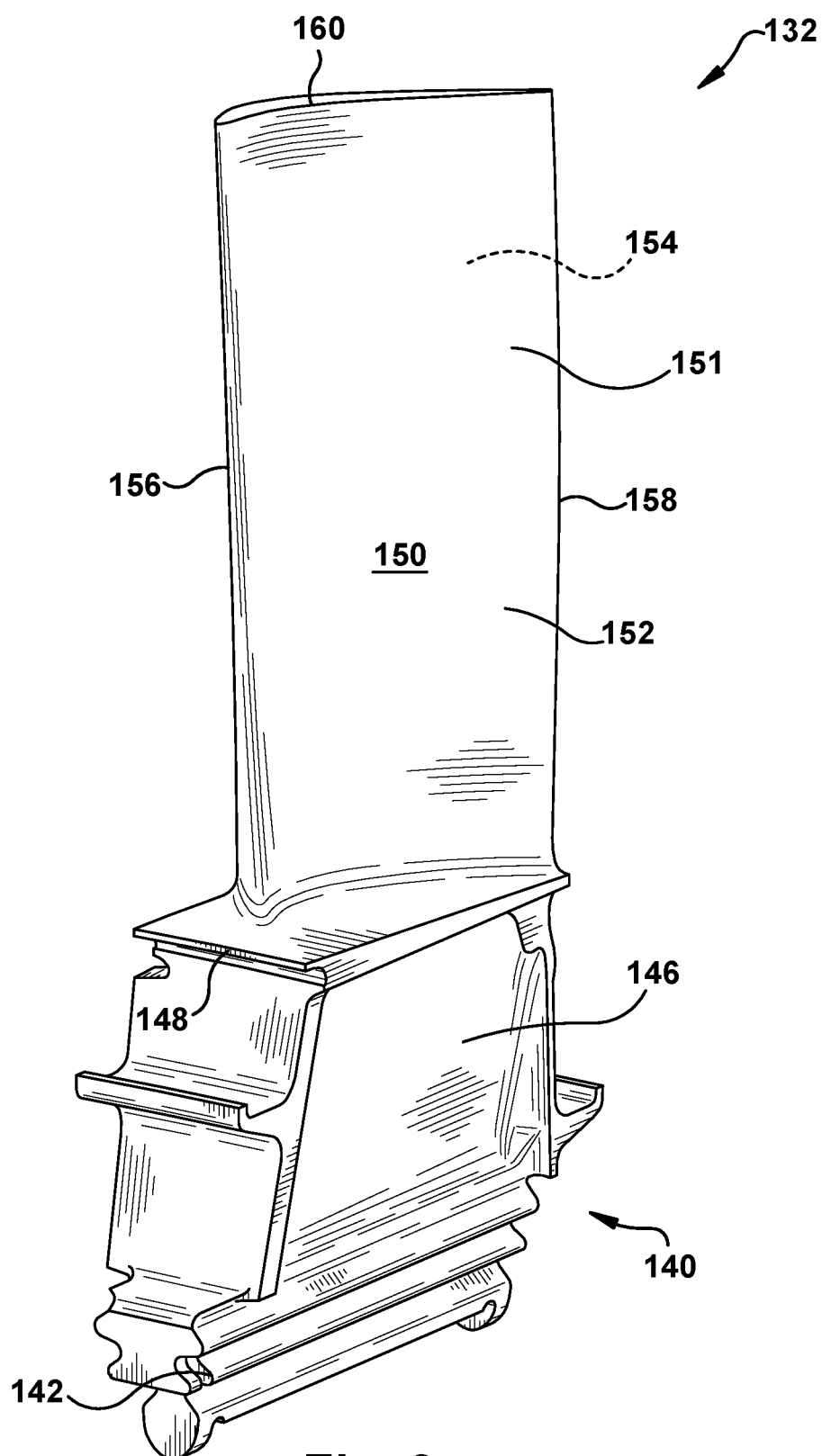
FIG. 3 shows a perspective view of a turbine rotor blade of the type in which embodiments of the present disclosure may be employed.
Figure 4:
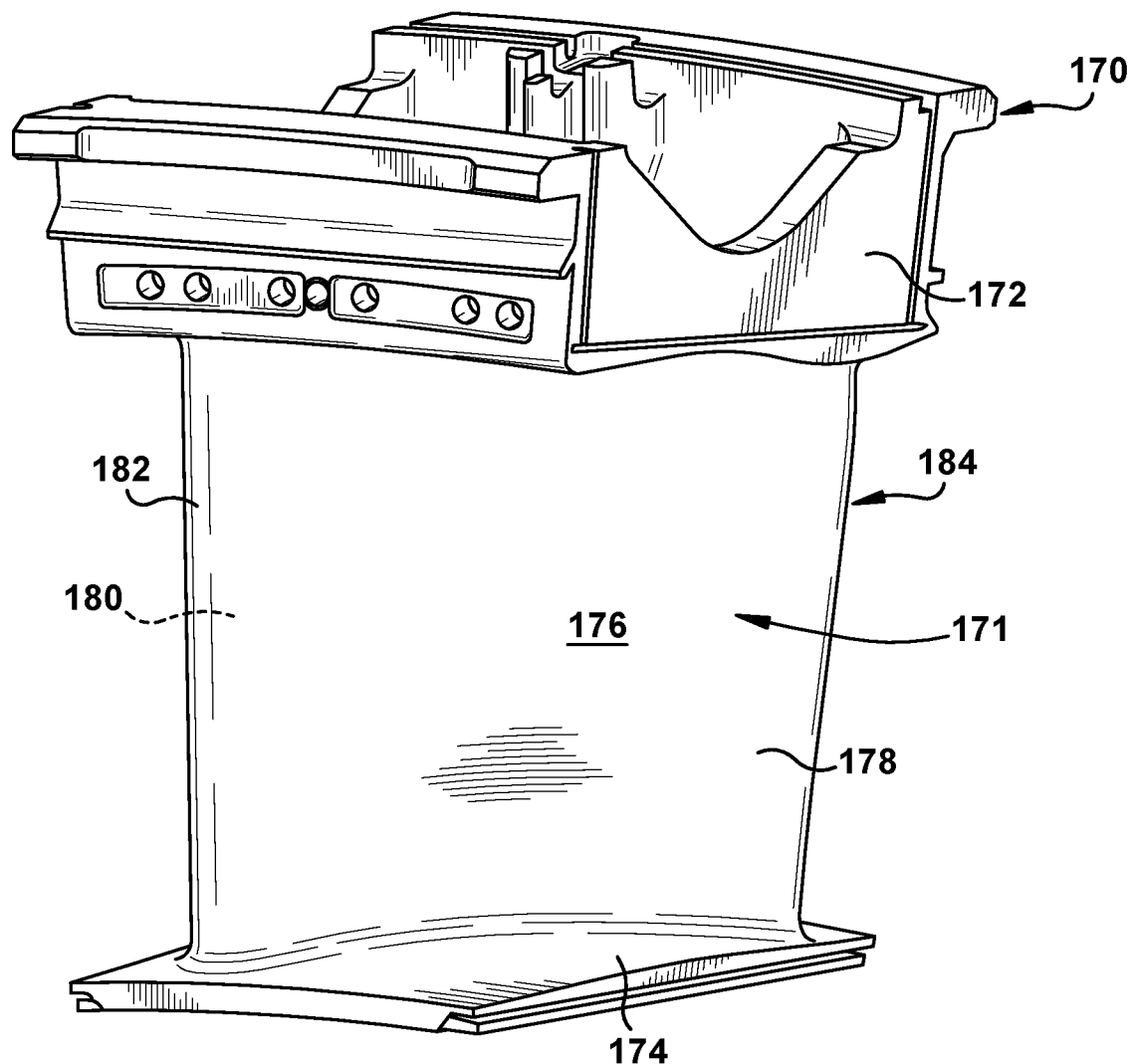
FIG. 4 shows a perspective view of a turbine vane of the type in which embodiments of the present disclosure may be employed.

FIGS. 3 and 4 show illustrative hot gas path turbine components (including turbine airfoils) of a turbomachine in which teachings of the disclosure may be employed. FIG. 3 shows a perspective view of a turbine rotor blade 132 of the type in which embodiments of the present disclosure may be employed. Turbine rotor blade 132 includes airfoil 150 having a body 151 with a root or base 140 by which rotor blade 132 attaches to rotor 112 (FIG. 2). Base 140 may include a dovetail 142 configured for mounting in a corresponding dovetail slot in the perimeter of a rotor wheel 144 (FIG. 2) of rotor 112 (FIG. 2). Base 140 may further include a shank 146 that extends between dovetail 142 and a platform 148, which is disposed at the junction of airfoil 150 and base 140 and defines a portion of the inboard boundary of the flow path through turbine assembly 110. It will be appreciated that airfoil 150 is the active component of rotor blade 132 that intercepts the flow of working fluid and induces the rotor disc to rotate. It will be seen that body 151 of airfoil 150 includes a concave pressure sidewall (PS) 152 and a circumferentially or laterally opposite convex suction sidewall (SS) 154 extending axially between opposite leading and trailing edges 156, 158 respectively. Sidewalls 152 and 154 also extend in the radial direction from platform 148 to an outboard tip 160.

FIG. 4 shows a perspective view of a stationary vane 170 of the type in which embodiments of the present disclosure may be employed. Stationary vane 170 includes an outer platform 172 by which stationary vane 170 attaches to stationary casing 122 (FIG. 2) of the turbomachine. Outer platform 172 may include any now known or later developed mounting configuration for mounting in a corresponding mount in the casing. Stationary vane 170 may further include an inner platform 174 (similar to tip 160 (FIG. 3)) for positioning between adjacent turbine rotor blades 132 (FIG. 3) platforms 148 (FIG. 3). Platforms 172, 174 define respective portions of the outboard and inboard boundary of the flow path through turbine assembly 110. It will be appreciated that airfoil 176 is the active component of stationary vane 170 that intercepts the flow of working fluid and directs it towards turbine rotor blades 132 (FIG. 3). It will be seen that airfoil 176 of stationary vane 170 includes a body 171 having a concave pressure sidewall (PS) 178 and a circumferentially or laterally opposite convex suction sidewall (SS) 180 extending axially between opposite leading and trailing edges 182, 184 respectively. Sidewalls 178 and 180 also extend in the radial direction from platform 172 to platform 174. Embodiments of the disclosure described herein may include aspects applicable to turbine airfoils of turbine rotor blade 132 and/or stationary vane 170. It is understood that other features of blade 132 or vane 170, not described herein such as but not limited to internal cooling structures, cutout shape, outer wall angling/shape, etc., may be customized for the particular application, i.e., rotor blade or vane.

Figure 5:
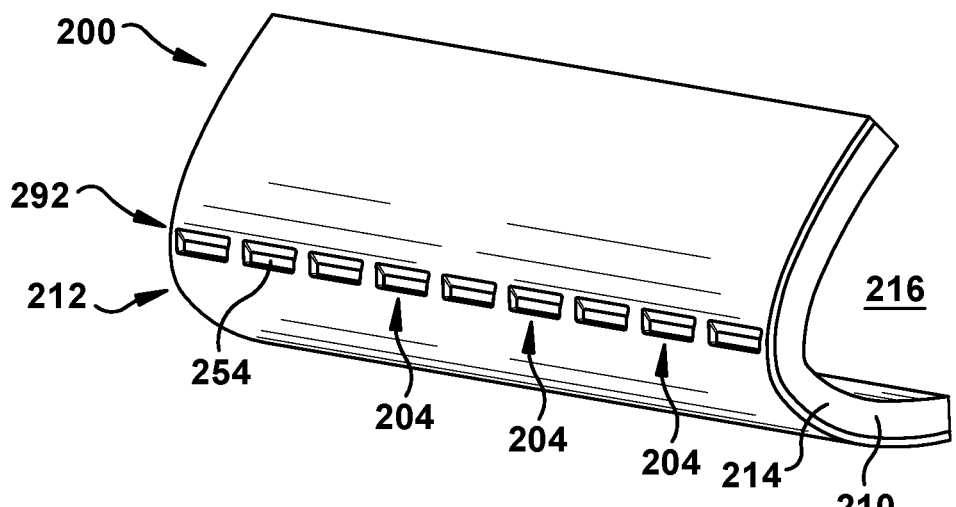
FIG. 5 shows a partial perspective view of a turbine airfoil according to embodiments of the disclosure.
Figure 6:
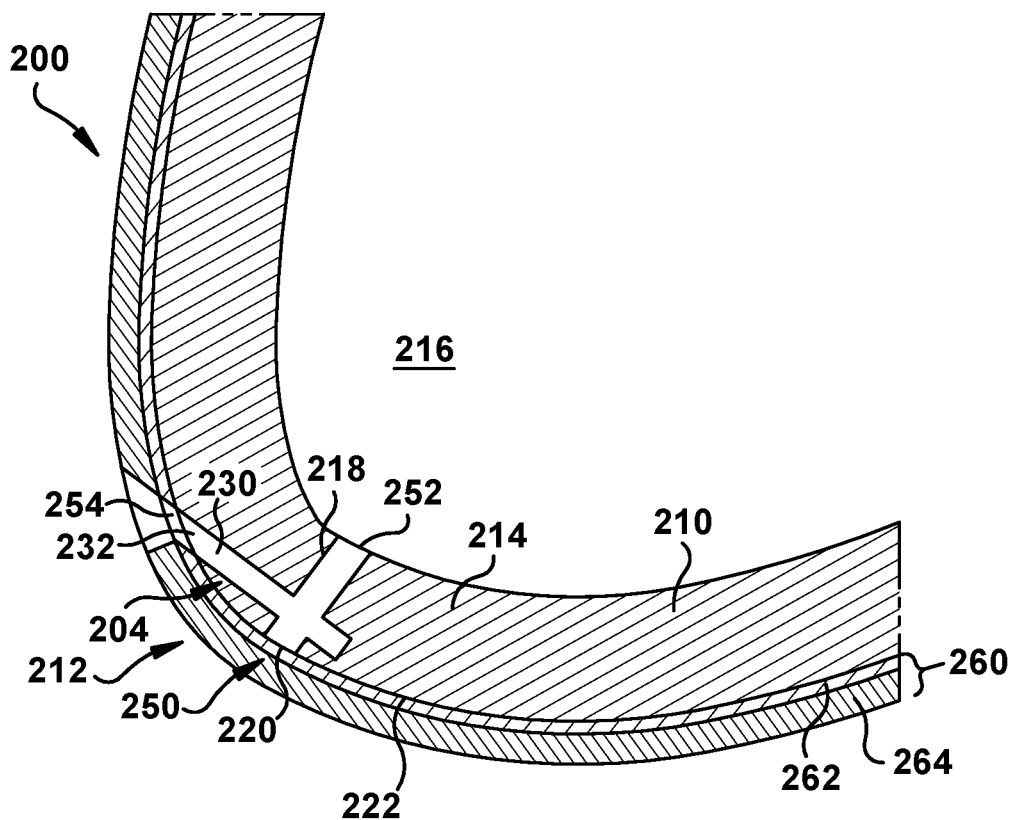
FIG. 6 shows a partial cross-sectional view of an airfoil wall of a turbine airfoil according to embodiments of the disclosure.

Referring to FIGS. 5-13, embodiments of a turbine airfoil 200 according to embodiments of the disclosure will now be described. As will be recognized, the structures described relative to airfoil 200 may be employed with airfoils 150, 176, as previously described herein, as applied to a gas turbine system or any other industrial machine using a turbine airfoil requiring cooling. FIG. 5 shows a partial perspective view, and FIG. 6 shows a partial cross-sectional view of a leading edge region of turbine airfoil 200 employing a cooling passage 204 according to embodiments of the disclosure. It is understood that turbine airfoil 200 may include, referring to FIG. 3 for reference to airfoil 150 where necessary, a body 210 having base 140 and tip 160 disposed opposite the base. An airfoil wall 214 of body 210 may include a pressure sidewall 152 and a suction sidewall 154 extending between leading edge 156 and trailing edge 158. In accordance with certain embodiments, airfoil wall 214 in which cooling passages according to embodiments of the disclosure are applied is disposed in leading edge 156 (FIG. 3) (as a leading edge wall). As noted, the teachings of the disclosure may be applicable to other locations of airfoil wall 214 in body 210. In some embodiments, body 210 may include a metal or metal alloy depending on the application of the turbine airfoil. Some examples include but are not limited to: Rene 108, CM247, Haynes alloys, Incalloy, MP98T, TMS alloys, CMSX single crystal alloys. In other embodiments, body 210 may include ceramic matrix composite (CMC). As understood, a coolant chamber 216 may pass within body 210. Coolant chamber 216 may carry any form of coolant, e.g., air, from any source, e.g., a compressor or other coolant chamber. As understood in the art, coolant chamber 216 can take a variety of forms and shapes within body 210. Body 210 and coolant chamber 216 may be formed using any now known or later developed process for forming turbine airfoil bodies such as but not limited to: casting and additive manufacturing.

Figure 7:
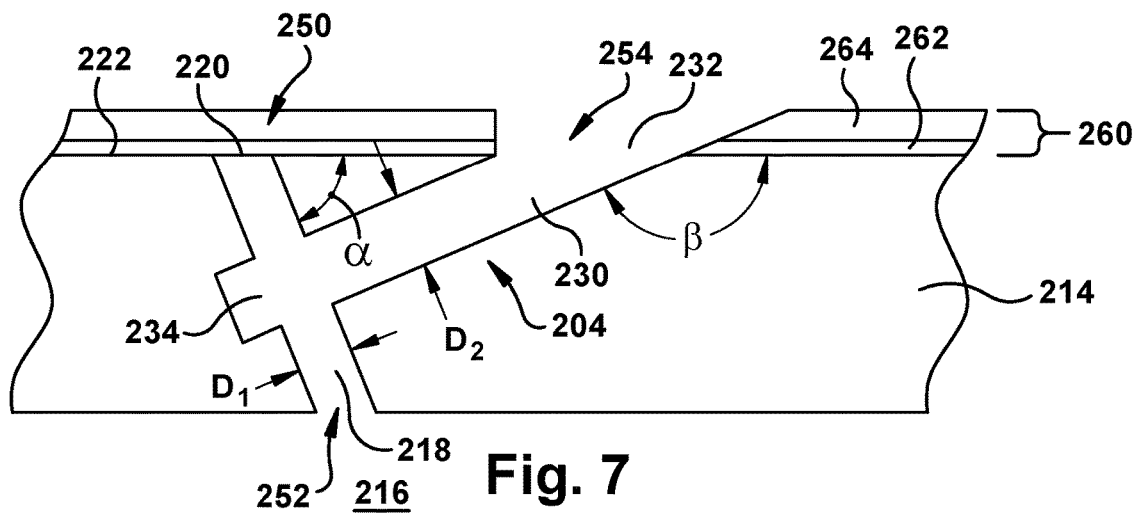
FIG. 7 shows an enlarged, partial cross-sectional view of the leading edge of FIG. 6.

As shown in FIG. 5, turbine airfoil 200 also may include a plurality of cooling passages 204 within airfoil wall 214. Embodiments of the disclosure are advantageous for a leading edge wall of airfoil 200, which exhibits a sharp radius as shown in FIGS. 5 and 6, but are also applicable to practically any location within airfoil wall 214. In one example, a leading edge may have a ratio of radius of curvature to wall thickness of less than eight (8); other definitions of what constitutes a leading edge may also be applicable. In addition, the embodiments may be particularly advantageous near the radial inward and outward ends of airfoil leading edges (i.e., airfoil base and tip), where traditional radial holes need to be angled away from edges, creating regions of low cooling effectiveness. As shown in FIG. 6 and the enlarged partial cross-sectional view of FIG. 7, each cooling passage 204 may include a first portion 218 extending from a first point 220 on an exterior surface 222 of airfoil wall 214 to coolant chamber 216. First portion 218 may be formed using any now known or later developed manner of forming a hole through airfoil wall 214. In one embodiment, first portion 218 is formed, prior to a thermal barrier coating (TBC) 260, e.g., bond coat layer 262 with TBC layer 264, or TBC layer 264 alone, being formed on exterior surface 222, as will be described herein, by drilling. The drilling may occur from outside of airfoil wall 214 inwardly to coolant chamber 216. Alternatively, the drilling may occur from within coolant chamber 216 outwardly, i.e., through exterior surface 222. As illustrated in FIG. 7, first portion 218 may meet at an angle α between approximately 45° and approximately 90° with exterior surface 222 of airfoil wall 214 at first point 220.

Figure 8:
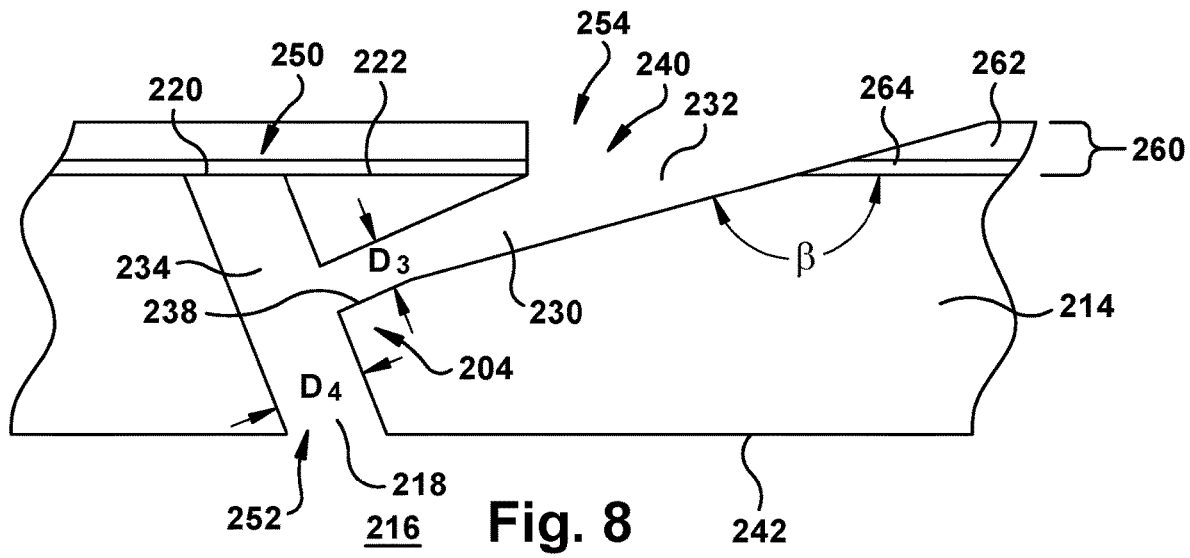
FIG. 8 shows an enlarged, partial cross-sectional view of an airfoil wall of a turbine airfoil according to another embodiment of the disclosure.
Figure 9:
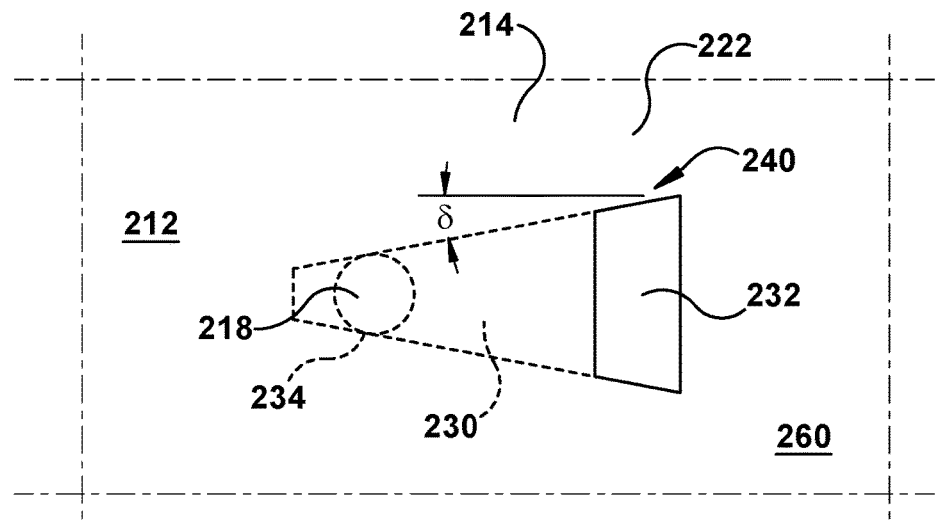
FIG. 9 shows an enlarged, plan view of the leading edge of FIG. 7 or 8 according to embodiments of the disclosure.

Each cooling passage 204 may also include a second portion 230 extending from a second point 232 on exterior surface 222 of airfoil wall 214 distal from first point 220 to intersect a mid-portion 234 of first portion 218. Second point 232 may be at a location downstream of first point 220, i.e., first portion 218 and second portion 230 are separated at exterior surface 222. Mid-portion 234 may be at any location between ends of first portion 218, i.e., such that second portion 230 does not fluidly connect at its inner end other than with first portion 218. Second portion 230 may be formed using any now known or later developed manner of forming a hole through airfoil wall 214. In one embodiment, second portion 230 may be formed, prior to TBC 260 being formed on exterior surface 222, as will be described herein, by drilling. Alternatively, second portion 230 may be formed after TBC 260 are formed on exterior surface 222, e.g., by drilling through TBC 260. In any event, the drilling may occur from outside of airfoil wall 214 inwardly to intersect mid-portion 234 of first portion 218. A depth of second portion 230 may be such that it crosses first portion 218, as shown in FIGS. 6 and 7, or it may simply connect with first portion 218, as shown in, for example, FIG. 8. As illustrated in FIG. 7, second portion 230 may meet at an angle β between approximately 135° and approximately 175° with exterior surface 222 of airfoil wall 214 at second point 232. Angle β and an orientation of second portion 230 creates greater coolant coverage and increased average effectiveness than traditional showerhead holes. Coolant passages 204 may direct coolant toward a pressure side and/or suction side of turbine airfoil 200. As shown in FIGS. 8 and 9, second portion 230, at second point 232, may optionally include a diffuser opening 240 in an axially downstream direction from leading edge 212. That is, second portion 230 at, and perhaps leading up to, second point 232 includes forming diffuser opening 240 in an axially downstream direction from leading edge 212. Diffuser opening 240 includes gradually widening walls that create a gradually increasing cross-sectional area. Here, second portion 230 diverges relative to exterior surface 222 and an interior surface 242 of airfoil wall 124 along a length thereof from mid-portion 234 of first portion 218 to second point 232. As shown in FIG. 9, each diffuser opening 240 may also have second portion 230 diverge radially at angles between 0° and 20° relative to a length of the body along a length of second portion 230 from mid-portion 234 of first portion 218 to second point 232. That is, each side of diffuser opening 240 may form a radial angle γ that is up to +/−0° to approximately 20°. It is also noted that where diffuser 240 is provided, a cross-sectional area thereof can be much larger than a cross-sectional area of first portion 218. Alternatively, diffuser 240 may be omitted and second portion 230 formed simply as a hole, which would appear similar in cross-section to that of FIG. 7.

In one embodiment, as shown in the plan view of leading edge 212 in FIG. 9, second portion 230 (shown in phantom within exterior surface 222) may diverge radially relative to a length of body 210 (into/out of page in FIGS. 7 and 8, vertical in FIG. 9) along a length of second portion 230 from mid-portion 234 of first portion 218 to second point 232. This arrangement creates diffuser opening 240. In another embodiment, shown in FIG. 8, second portion 230 may diverge relative to exterior surface 222 and an interior surface 242 of airfoil wall 214 along a length thereof from mid-portion 234 of first portion 218 to second point 220 to create diffuser opening 240. The FIGS. 8 and 9 embodiments may exist separately or collectively. A diverging second portion 230, and in particular, diffuser opening 240, can be formed using any now known or later developed angled drilling technique, such as computer numerical controlled (CNC) milling, laser, or electrical discharge machining (EDM).

In certain embodiments, as shown in FIG. 7, first portion 218 may have a cross-sectional area (D1) that is less than a cross-sectional area (D2) of second portion 230. In this fashion, first portion 218 may be sized to meter coolant flow through cooling passage 204. In another embodiment, shown in FIG. 8, a portion 238 of second portion 230, near an entry point thereof, may have a cross-sectional area (D3) that is less than a cross-sectional area (D4) of first portion 218. In this fashion, coolant flow may be metered into second portion 230.

Each cooling passage 204 also includes a cap element 250 closing first portion 218 at first point 220 but leaving second portion 230 open, i.e., at second point 232. In this fashion, each cooling passage 204 has a single inlet 252 in fluid communication with coolant chamber 216 and a single outlet 254 at second point 232 of second portion 230. That is, despite first portion 218 and second portion 230 penetrating exterior surface 222 of airfoil wall 214, only one outlet 254 is ultimately provided. Coolant passes through part of first portion 218 and then exits through second portion 230 and is directed downstream, creating a film layer on turbine airfoil 200.

The process of closing first portion 218 at first point 220 with cap element 250 may take a variety of forms. In one embodiment, shown in FIGS. 5-8, cap element 250 simply includes TBC 260, e.g., bond coat layer 262 with TBC layer 264, or TBC layer 264 alone. Here, closing first portion 218 with cap element 250 includes forming TBC 260 over exterior surface 222. TBC 260 has sufficient thickness to close first portion 218 at first point 220. As illustrated, while first portion 218 is closed at first point 220 by TBC 260, second portion 230 of each cooling passage 204 extends through the TBC at second point 232 thereof. TBC 260 may naturally not close second portion 230, e.g., because second point 232 is larger than first point 220 or a coating collector is employed within diffuser 240 to collect unnecessary coating. Alternatively, second portion 230 may be re-opened after TBC 260 formation (e.g., by drilling or etching), or second portion 230 could be machined after exterior surface 222 is coated. TBC 260 may be shaped to accommodate a shape of second portion 230 at second point 220, e.g., it may continue surfaces of second portion 230 to maintain diffuser opening 240. Alternatively, TBC 260 may be shaped differently than second portion 230 to create a different path for coolant. TBC 260 may include a bond coat layer 262, where necessary, and TBC layer 264, TBC layer 264 alone. Bond coat layer 262 may include any now known or later developed bond coat material such as but not limited to: nickel or platinum aluminides, nickel chromium aluminum yttrium (NiCrAlY) or nickel cobalt chromium aluminum yttrium (NiCoCrAlY). TBC layer 264 may include any now known or later developed TBC material such as but not limited to: yttria-stabilized zirconia (YSZ), mullite and alumina. TBC 260 may include additional layers also such as a thermally grown oxide.

Figure 10:
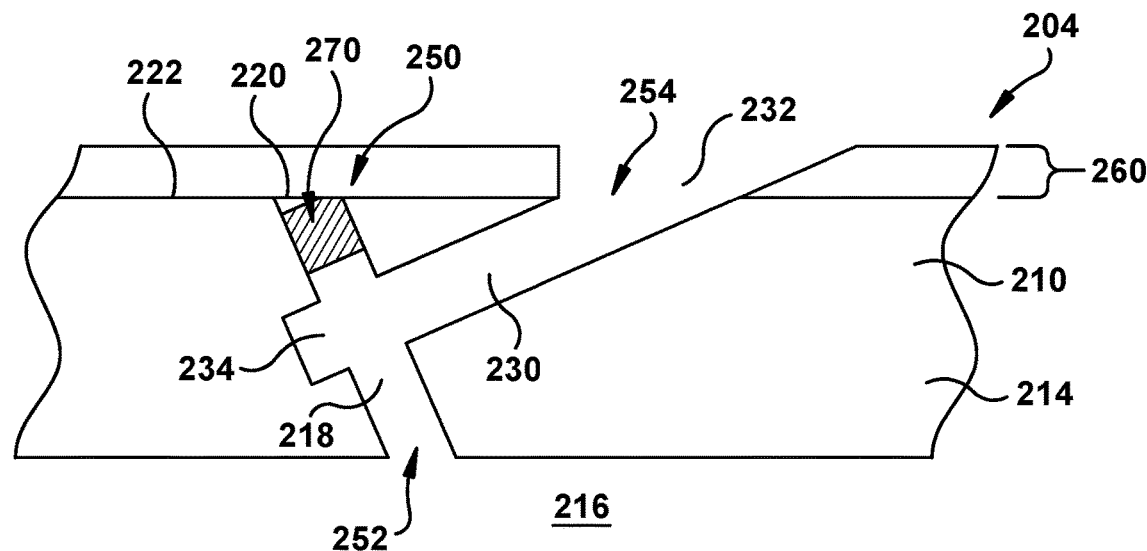
FIG. 10 shows an enlarged, partial cross-sectional view of an airfoil wall of a turbine airfoil according to another embodiment of the disclosure.

In another embodiment, shown in the enlarged partial cross-section of FIG. 10, cap element 250 may also include a metal plug 270 in first portion 218 at or near first point 220, e.g., to fill the void in exterior surface 222 or to leave a small recess capable of filling by TBC 260. Here, closing first portion 218 with cap element 250 includes forming metal plug 270 in first portion 218 at or near first point 220. Metal plug 270 may include the same material as body 210, e.g., a metal or metal alloy or CMC, capable of integral connection to body 210, e.g., brazing or welding. As previously described, TBC 260 may be formed to cover exterior surface 222 of airfoil wall 214, and second portion 230 of each cooling passage 204 extends through TBC 260 at second point 232 thereof. TBC 260 also cover first portion 218 and metal plug 270.

Figure 11:
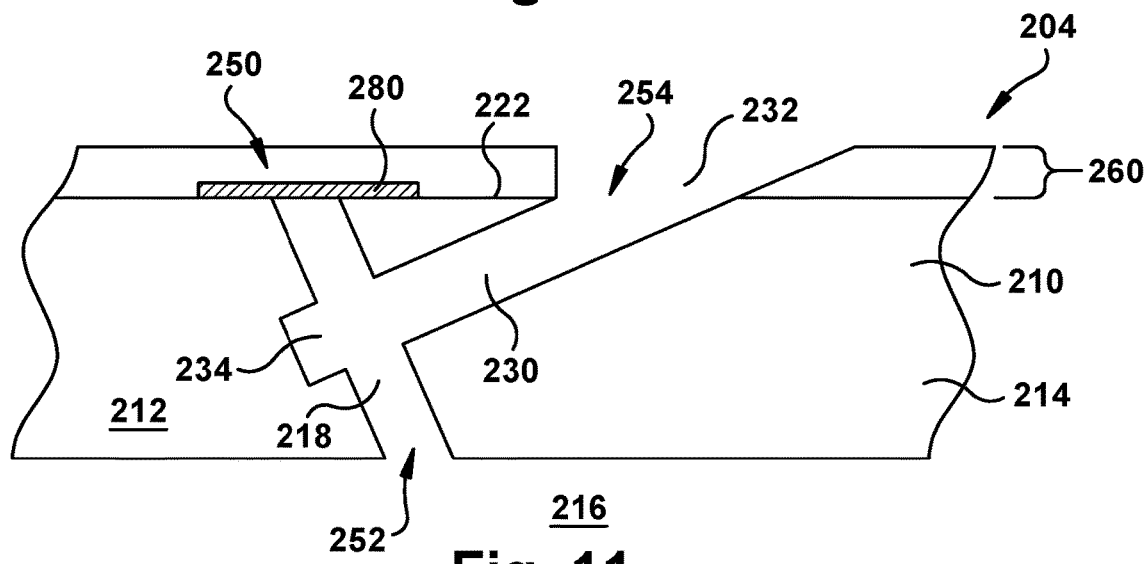
FIG. 11 shows an enlarged, partial cross-sectional view of an airfoil wall of a turbine airfoil according to another embodiment of the disclosure.

In another embodiment, shown in the enlarged partial cross-section of FIG. 11, cap element 250 includes a metal layer 280 across first portion 218 at first point 220. Metal layer 280 can be joined to exterior surface 222 of airfoil wall 214 by brazing, welding, or other joining method. Here, closing first portion 218 with cap element 250 includes forming metal layer 280 across first portion 218 at first point 220. Body 210 includes a metal or metal alloy in this embodiment. Metal layer 280 may be any suitable metal or metal alloy appropriate for joining to body 210 at airfoil wall 214, and will depend on the metal of body 210. As previously described, TBC 260 covers exterior surface 222 of airfoil wall 214, and second portion 230 of each cooling passage 204 extends through TBC 260 at second point 232 thereof. In FIG. 11, metal layer 280 is on surface 222, but could also be recessed into surface 222.

Regardless of the form of cap element 250 employed, processing may also include exterior surface 222 preparation processes to, for example, assist in having TBC 260 or metal layer 280 close first portion 218. Preparation processes may include but are not limited to deformation processes such as a shot peening of exterior surface 222.

Figure 12:
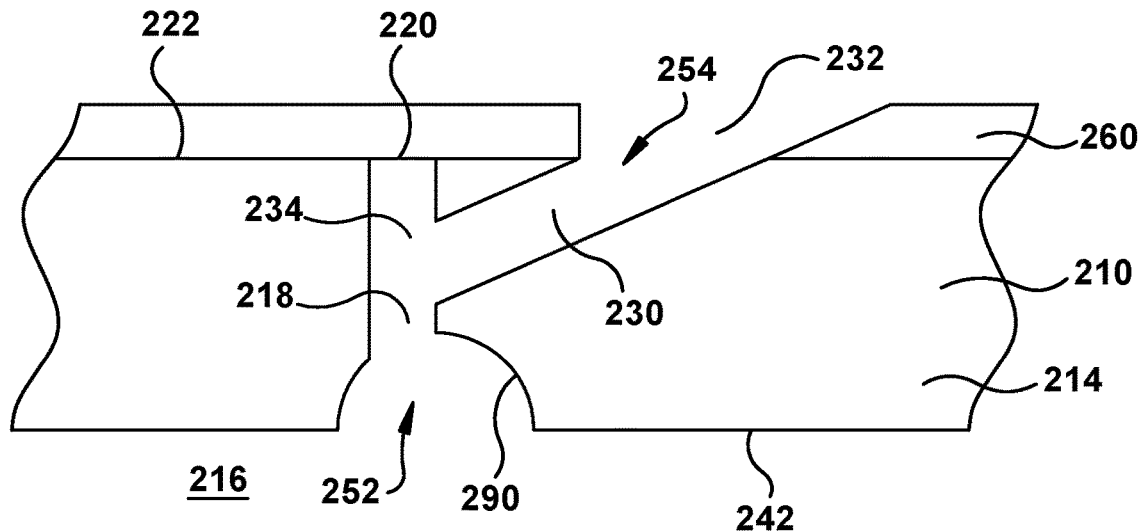
FIG. 12 shows an enlarged, partial cross-sectional view of an airfoil wall of a turbine airfoil according to another embodiment of the disclosure.
Figure 13:
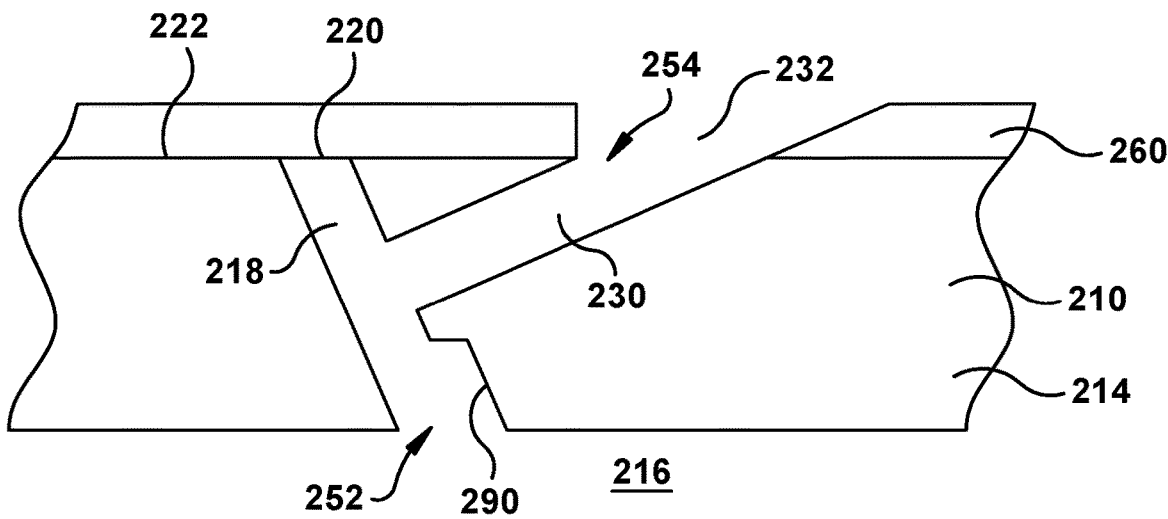
FIG. 13 shows an enlarged, partial cross-sectional view of an airfoil wall of a turbine airfoil according to yet another embodiment of the disclosure.

FIGS. 12 and 13 show other embodiments in which internal surface 242 of body 210 may include an enlarged inlet portion 290 to which first portion 218 is formed. Enlarged inlet portion 290 may be formed in any now known fashion either after or with body 210 formation, e.g., via casting or additive manufacturing. Enlarged inlet portion 290 can have any shape, e.g., rounded as in FIG. 12 or polygonal as in FIG. 13.

Cooling passages 204 may be formed directly in body 210, or as shown in FIG. 5, may be provided as part of a coupon 292 coupled to an opening in airfoil wall 214. That is, a portion of leading edge 212 including plurality of cooling passages 204 and cap element 250 includes a coupon 292 coupled to a remaining portion of (metal) body 210. Coupon 292 may be formed using any now known or later developed processes, e.g., casting and drilling, or additive manufacture.

Portions of cooling passage, except as otherwise described herein, may have any cross-sectional shape desired, e.g., circular, elliptical, polygonal, etc.

Embodiments of the disclosure provide a turbine airfoil, blade and/or nozzle, having an airfoil wall with increased cooling effectiveness, allowing the turbomachine in which employed to be more efficient through increased firing temperature or overall reducing coolant usage. The cooling effectiveness of the two portion cooling passages described herein are higher than conventional diffusing holes, conical holes, and round holes. The improved effective cooling provided can extend part life through reductions in metal temperature and decreased likelihood of TBC spallation. Thus, embodiments of the disclosure can also reduce the likelihood of unplanned outages and increase the duration of time in which parts need to be repaired. Cooling passage 204 surface area is larger than traditional holes in all embodiments, which also increase an internal cooling, especially where impingement cooling is provided inside of coolant passage 216. The teachings of the disclosure are especially advantageous for a leading edge wall of an airfoil, but can also be applied elsewhere on the airfoil.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−5% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine airfoil, comprising:
a body having an airfoil wall;
a coolant chamber within the body; and
a plurality of cooling passages within the airfoil wall, each cooling passage including:
a first portion extending from a first point on an exterior surface of the airfoil wall to the coolant chamber,
a second portion extending from a second point on the exterior surface of the airfoil wall distal from the first point to intersect a mid-portion of the first portion, and
a cap element closing completely the first portion at the first point but leaving the second portion open,
wherein each cooling passage has a single inlet in fluid communication with the coolant chamber and a single outlet at the second point of the second portion, and wherein the second portion includes a diffuser opening in an axially downstream direction from a leading edge of the turbine airfoil.

2. The turbine airfoil of claim 1, wherein the second portion diverges relative to the exterior surface and an interior surface of the airfoil wall along a length thereof from the mid-portion of the first portion to the second point.

3. The turbine airfoil of claim 1, wherein the second portion diverges radially at angles between 0° and approximately 20° relative to a length of the body along a length of the second portion from the mid-portion of the first portion to the second point.

4. The turbine airfoil of claim 1, wherein the second portion crosses the mid-portion of the first portion.

5. The turbine airfoil of claim 1, wherein the first portion meets at an angle between approximately 45° and approximately 90° with the exterior surface of the airfoil wall at the first point, and the second portion meets at an angle between approximately 135° and approximately 175° with the exterior surface of the airfoil wall at the second point.

6. The turbine airfoil of claim 1, wherein the cap element includes a thermal barrier coating (TBC), the second portion of each cooling passage extending through the TBC at the second point thereof.

7. The turbine airfoil of claim 1, wherein the cap element includes a metal plug in the first portion at or near the first point, and further comprising a thermal barrier coating (TBC) covering the exterior surface of the airfoil wall, the second portion of each cooling passage extending through the TBC at the second point thereof.

8. The turbine airfoil of claim 1, wherein the cap element includes a metal layer across the first portion at the first point, and further comprising a thermal barrier coating (TBC) covering the exterior surface of the airfoil wall, the second portion of each cooling passage extending through the TBC at the second point thereof.

9. The turbine airfoil of claim 1, wherein a portion of the airfoil including the plurality of cooling passages and the cap element includes a coupon coupled to a remaining portion of the body.

10. The turbine airfoil of claim 1, wherein a cross-sectional area of the first portion is smaller than a cross-sectional area of the second portion where the second portion intersects the mid-portion of the first portion.

11. The turbine airfoil of claim 1, wherein the body includes a base and a tip disposed opposite the base, and a pressure sidewall and a suction sidewall extending between the leading edge and a trailing edge, and wherein the airfoil wall is disposed in the leading edge.

12. A method of forming a cooling passage in an airfoil wall of a turbine airfoil, the turbine airfoil including a coolant chamber therein, the method comprising:

forming a first portion of the cooling passage, the first portion extending from a first point on an exterior surface of the airfoil wall to the coolant chamber;

forming a second portion of the cooling passage, the second portion extending from a second point on the exterior surface of the airfoil wall distal from the first point to intersect a mid-portion of the first portion; and closing completely the first portion at the first point with a cap element but leaving the second portion open, wherein the cooling passage has a single inlet in fluid communication with the coolant chamber and a single outlet at the second point of the second portion, and wherein the second portion includes a diffuser opening in an axially downstream direction from a leading edge of the turbine airfoil.

13. The method of claim 12, wherein each forming includes drilling.

14. The method of claim 12, wherein forming the first portion includes drilling from within the coolant chamber outwardly.

15. The method of claim 12, wherein closing the first portion with the cap element includes forming a thermal barrier coating (TBC) over the exterior surface, the second portion of the cooling passage extending through the TBC at the second point thereof.

16. The method of claim 12, wherein closing the first portion with the cap element includes forming a metal plug in the first portion at or near the first point, and further comprising forming a thermal barrier coating (TBC) over the exterior surface, the second portion of the cooling passage extending through the TBC at the second point thereof.

17. The method of claim 12, wherein closing the first portion with the cap element includes joining a metal layer across the first portion at the first point, and further comprising forming a thermal barrier coating (TBC) over the exterior surface, the second portion of the cooling passage extending through the TBC at the second point thereof.

18. The method of claim 12, wherein forming the first portion and the second portion includes forming a cross-sectional area of the first portion smaller than a cross-sectional area of the second portion where the second portion intersects the mid-portion of the first portion.

* * * * *